3,487,086
7-BENZYL-7H-YOHIMBANES
John Shavel, Jr., Mendham, and Maximilian von Strandtmann, Rockaway Township, N.J., assignors to Warner-Lambert Pharmaceutical Company, Morris Plains, N.J., a corporation of Delaware
No Drawing. Filed Oct. 27, 1967, Ser. No. 678,503
Int. Cl. C07d 57/10; A61k 27/00
U.S. Cl. 260—286                2 Claims

ABSTRACT OF THE DISCLOSURE

The present invention describes isomeric 7-benzyl-7H-yohimbane. These yohimbanes have the formula:

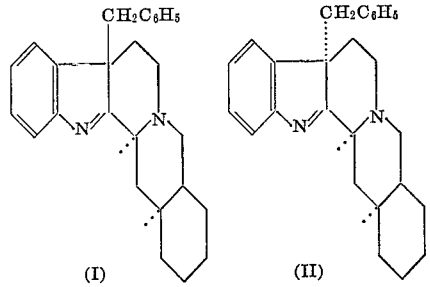

They are prepared by treating a yohimbane alkali metal salt with benzylbromide in liquid ammonia. These yohimbanes are useful as antiarrhythmic agents.

---

The present invention relates to yohimbane derivatives which are substituted by a benzyl group at position C-7. These yohimbanes may be represented by the formula:

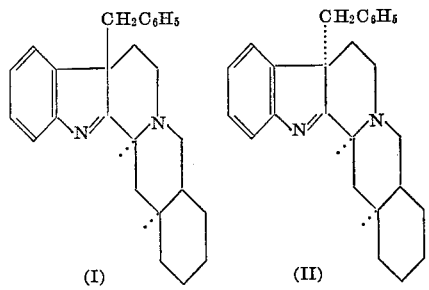

These 7-benzyl-7H-yohimbanes have the property of converting oubain induced arrhythmias in a mammal to a sinus rhythm. Because of this activity, they are useful as antiarrhythmic agents in mammals such as dogs, cats, monkeys and the like. Generally speaking, the compounds are administered orally or parenterally, preferably intravenously, at a dosage of about 2–5 mg./kg. to the mammal in order to achieve the antiarrhythmic effect. Thus, for example, to a mammal weighing about 70 kg. in body weight, a dose of about 140 to 350 mg. is prescribed to achieve the antiarrhythmic effect. This dosage regimen may be repeated two or three times a day. The dosage may be adjusted according to variations in body weight, age or sex or the species of the mammal being treated according to methods well known to the healing arts.

In order to use these compounds, they are combined with a parenterally acceptable vehicle, such as water, saline, peanut oil and the like, to form dosage forms suitable for parenteral injection. Additionally, the compounds of this invention may also be combined with known pharmaceutical excipients such as lactose, mannitol, dicalcium phosphate and the like to form dosage forms suitable for oral administration, such as tablets, capsules, and the like.

According to the present invention, the above compounds are prepared by treating the alkali metal salt, such as yohimbane sodium salt, with benzylbromide in liquid ammonia. The desired reaction products may be recovered from the reaction mixture according to standard chemical techniques. Thus, the reaction produces a mixture containing N-benzyl yohimbane, 7α-benzyl- yohimbane and 7β-benzyl-yohimbane. They are recovered by crystallization and fractionation techniques as described in the examples.

While the above described reaction illustrates the benzylation of yohimbane, the same principle is applicable to other compounds, such as epi-yohimbane, allo-yohimbane, epialloyohimbane, 1,2,3,4-tetrahydro-β-carboline or indoloquinolizidines. Additionally, the same reaction condition may also be produced by using other alkylating agents instead of benzylbromide. These alkylating agents are, for example, alkyl halides, aralkyl halides, phenacyl halides and the like.

The compounds of this invention also form acid addition salts and quaternary ammonium salts. These salts are prepared as follows:

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate.

The following example is included in order to further illustrate the invention.

Example 1

*Benzylation of yohimbane.*—Sodium (3 g.) was added portionwise to liquid ammonia (1,200 ml.) and the reaction mixture was stirred for about 25 min. when all the metal had dissolved and cooled in an acetone-Dry Ice bath. Yohimbane (33.6 g.) was added in portions and the stirring was continued for 1 hr. A solution of benzyl bromide (22 g.) in ether (120 ml.) was added dropwise over a period of 2.5 hrs. The acetone-Dry Ice cooling bath was removed and ammonia was allowed to evaporate. Water (500 ml.) was added and the mixture was extracted with two 500-ml. portions of chloroform. The extracts were dried over sodium sulfate, filtered and evaporated. The oily residue, on crystallization and fractionation from acetonitrile, gave the following fractions:

(A) *1-benzylyohimbane.*—14.6 g. (33%), M.P. 184–186.5°; $[\alpha]_D^{25} = -115°$ (0.4%, in pyridine).

*Analysis.*—Calcd. for $C_{26}H_{30}N_2$: C, 84.28; H, 8.16; N, 7.56. Found: C, 84.30; H, 8.27; N, 7.59.

(B) *7β-benzyl-7H-yohimbane.*—6.45 g. (14.5%), M.P. 142–144°; $[\alpha]_D^{25} = -111°$ (0.7%, in pyridine).

*Analysis.*—Calcd. for $C_{26}H_{30}N_2$: C, 84.28; H, 8.16; N, 7.56. Found: C, 83.98; H, 8.25; N, 7.59.

The compounding methiodide has the following properties: M.P. 246–249°, calcd. for $C_{27}H_{33}N_2I$: C, 63.28; H, 6.49; N, 5.47; I, 24.76. Found: C, 63.20; H, 6.61; N, 5.44; I, 24.81.

(C) *7α-benzyl-7H-yohimbane.*—4.6 g. (10.4%), M.P. 166–168.5°. $[\alpha]_D^{25} = +72°$ (0.4%, in methanol).

*Analysis.*—Calcd. for $C_{26}H_{30}N_2$: C, 84.28; H, 8.16; N, 7.56. Found: C, 84.09; H, 8.30; N, 7.81.

The compounding methiodide has the following properties, M.P. 258–260°, calcd. for $C_{27}H_{33}N_2I$: C, 63.28; H, 6.49; N, 5.47; I, 24.76. Found: C, 63.25; H, 6.55, N, 5.69; I, 24.66.

It is understood that the foregoing detailed description is given merely by way of illustration and that many variations may be made therein without departing from the spirit of our invention.

Having described out invention, what we desire to secure by Letters Patent is:

1. A member selected from the group consisting of free base of the formula

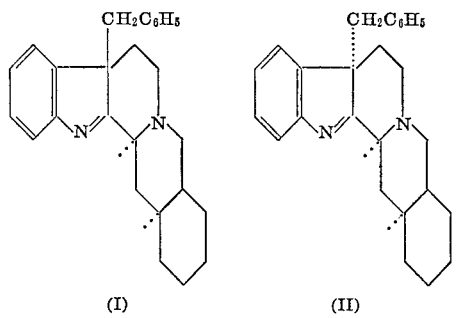

and their acid addition salts and their quaternary ammonium salts.

2. A method for the preparation of the free base according to claim 1 which comprises treating the alkali metal salt of yohimbane with benzylbromide in liquid ammonia.

References Cited

Von Strandtmann et al.: J. Org. Chem., vol. 31, December 1966, pp. 4202–4.

JAMES A. PATTEN, Primary Examiner

U.S. Cl. X.R.
260—236, 288, 999